(12) United States Patent
Bamberger et al.

(10) Patent No.: US 7,986,963 B2
(45) Date of Patent: Jul. 26, 2011

(54) WIRELESS COMMUNICATION DEVICE

(75) Inventors: Joachim Bamberger, Stockdorf (DE);
Michael Krüger, Paderborn (DE);
Henning Lenz, Karlsruhe (DE); Gunter Magin, München (DE)

(73) Assignee: Siemens Aktiengesellschaft, Munich (DE)

( * ) Notice: Subject to any disclaimer, the term of this patent is extended or adjusted under 35 U.S.C. 154(b) by 464 days.

(21) Appl. No.: 12/087,135

(22) PCT Filed: Dec. 7, 2006

(86) PCT No.: PCT/EP2006/069402
§ 371 (c)(1),
(2), (4) Date: Nov. 18, 2008

(87) PCT Pub. No.: WO2007/077090
PCT Pub. Date: Jul. 12, 2007

(65) Prior Publication Data
US 2009/0221332 A1 Sep. 3, 2009

(30) Foreign Application Priority Data
Dec. 29, 2005 (DE) .......................... 10 2005 062 947

(51) Int. Cl.
*H04M 1/00* (2006.01)
(52) U.S. Cl. .................. 455/550.1; 455/556.1; 455/418; 340/691.3; 701/19
(58) Field of Classification Search ............... 455/550.1, 455/556.1, 418; 340/691.3; 701/19
See application file for complete search history.

(56) References Cited

U.S. PATENT DOCUMENTS

| | | | |
|---|---|---|---|
| 7,498,951 B2 * | 3/2009 | Wardimon | 340/691.3 |
| 7,706,934 B2 * | 4/2010 | Sakamoto et al. | 701/19 |
| 2001/0031633 A1 * | 10/2001 | Tuomela et al. | 455/417 |
| 2002/0166437 A1 * | 11/2002 | Nishitani et al. | 84/600 |
| 2003/0045274 A1 * | 3/2003 | Nishitani | 455/414 |
| 2003/0083075 A1 | 5/2003 | Miyazaki et al. | |
| 2005/0250551 A1 * | 11/2005 | Helle | 455/567 |

FOREIGN PATENT DOCUMENTS

| | | |
|---|---|---|
| DE | 19644445 A1 | 4/1998 |
| DE | 19733579 A1 | 2/1999 |
| DE | 19923750 A1 | 11/1999 |
| EP | 0853300 A2 | 7/1998 |
| WO | WO 98/34126 A1 | 8/1998 |

* cited by examiner

*Primary Examiner* — Danh C Le

(57) ABSTRACT

The invention relates to a wireless communication device comprising an electrically operated radio module for wireless communication by receiving and/or transmitting communication signals in a transmitting and/or receiving mode; an electrically operated processor unit for controlling wireless communication via the radio module; a motion sensor for detecting movements and/or accelerations of the communication device, wherein the motion sensor outputs at least one detection signal to the processor unit in the event of the occurrence of movements and/or accelerations of a predetermined magnitude, wherein the processor unit is coupled to the motion sensor and the radio module in such a manner that it occasionally puts the radio module into the transmitting and/or receiving mode when outputting the at least one detection signal of the motion sensor.

19 Claims, 1 Drawing Sheet

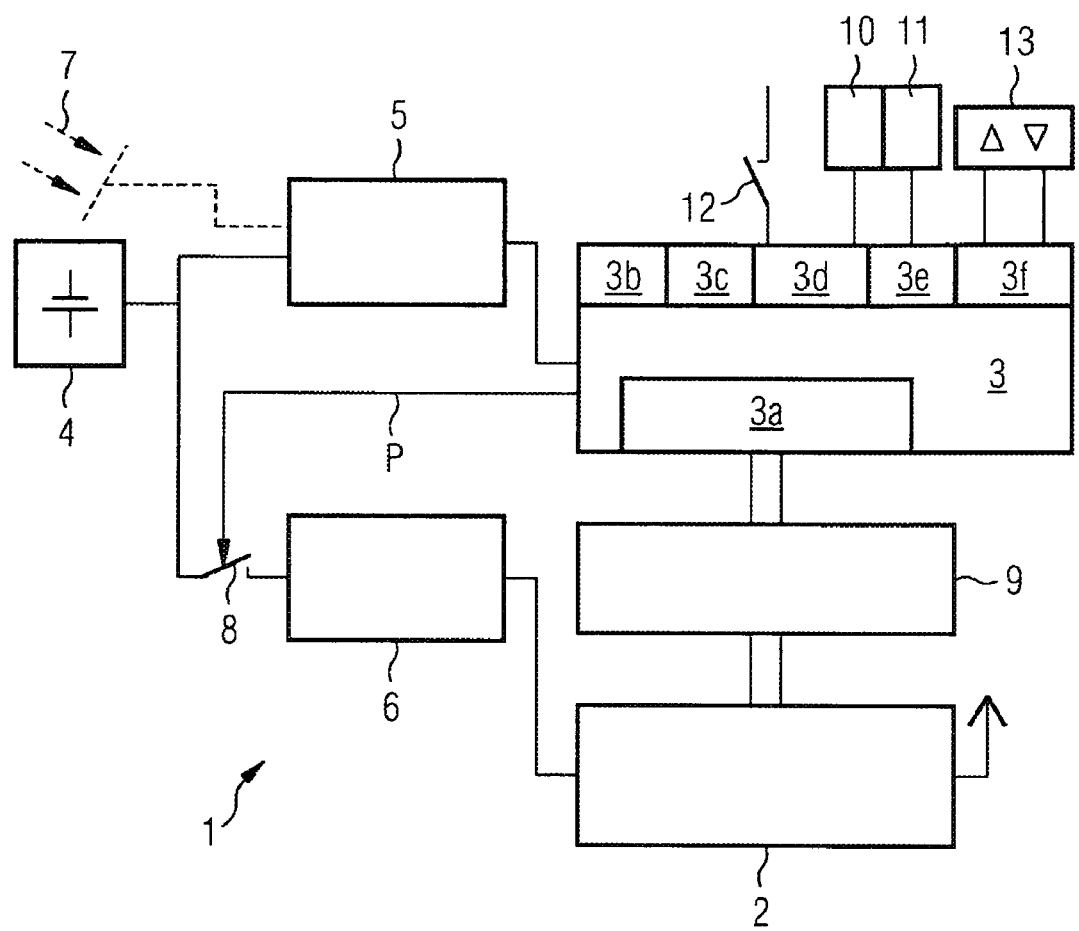

WIRELESS COMMUNICATION DEVICE

CROSS REFERENCE TO RELATED APPLICATIONS

This application is the U.S. National Stage of International Application No. PCT/EP2006/069402, filed Dec. 7, 2006 and claims the benefit thereof. The International Application claims the benefits of German application No. 10 2005 062 947.4 filed Dec. 29, 2005, both of the applications are incorporated by reference herein in their entirety.

FIELD OF INVENTION

The invention relates to a wireless communication device.

BACKGROUND OF THE INVENTION

In the logistics systems field as well as in person and goods monitoring applications it is necessary to locate the position of objects and/or individuals. Wireless communication devices can be used for this purpose, said devices being attached to the objects whose position is to be located and communicating wirelessly with further units via a radio module. When necessary, the positions of the objects can then be determined by way of the wirelessly transmitted communication signals. In a WLAN network, for example, the position of the communication device can be detected by way of the field strength of the radio link relative to access points of the network and from this the location of the device can be estimated. Another possible wireless connection for determining the location of a device are mobile radio links and GPS, wherein satellite signals are received via a GPS antenna and the position is calculated from this.

Conventional wireless communication devices have the disadvantage that the radio modules used in the devices have a relatively high transmit power of 100 mW to 2000 mW. Due to this high energy consumption the operation time of devices of this kind is short, in particular in the case of mobile applications, since said devices are often provided with batteries which quickly become discharged due to the high transmit powers.

In the case of trackable wireless communication devices it is known from the prior art to reduce the power requirements by means of a short turn-on time of the energy-intensive radio module and of the processor in the device. However, it proves disadvantageous that abrupt and rapid changes in the position of said devices are not tracked sufficiently quickly, since under certain conditions such changes of position occur when the radio module is switched off and consequently are not detected.

SUMMARY OF INVENTION

It is therefore the object of the invention to create a wireless communication device which has a longer service life than conventional devices and ensures rapid detection of changes of position.

This object is achieved by means of the independent claim. Developments of the invention are defined in the dependent claims.

The wireless communication device according to the invention comprises an electrically powered radio module for the purpose of wireless communication by receiving and/or transmitting communication signals in a transmitting and/or receiving mode. The wireless communication is controlled by means of an electrically powered processor unit. Also provided in the device is a sensor for detecting movements and/or accelerations of the communication device, referred to hereinafter as a motion sensor. When movements and/or accelerations of a predetermined magnitude occur, the motion sensor outputs at least one detection signal to the processor unit, the processor unit being coupled to the motion sensor and the radio module in such a way that when the at least one detection signal of the motion sensor is output, the processor unit puts the radio module temporarily, i.e. for a predefined period of time, into the transmitting and/or receiving mode.

Coupling the output of an acceleration- or movement-sensitive sensor to the transmitting and/or receiving mode of the radio module ensures that any change in position of the communication device that is detected by the motion or acceleration sensor of the device leads to a commencement of the wireless communication via the radio module. For this reason changes of position can be instantly detected by means of the radio module by way of the wireless communication. In this case the transmitting and/or receiving mode is turned on only temporarily and subsequently said operating mode is terminated again, and the radio module then switches for example into an energy-saving idle mode in which no transmitting or receiving of communication signals is possible. Because the radio module goes only temporarily into the energy-intensive transmitting and/or receiving mode as and when needed, energy consumption is reduced considerably by the communication device according to the invention compared to devices of the kind in which the radio module is always active. Nonetheless, a communication via the radio module is always guaranteed whenever the wireless communication device changes position, with the result that changes of position are always detected.

In a particularly preferred embodiment of the invention, the processor unit of the communication device according to the invention is implemented in such a way that it puts the radio module into the transmitting and/or receiving mode until a transmitting and/or receiving transaction has been completed by the radio module and/or until a predetermined period of time without output of a detection signal by the motion sensor has elapsed. Subsequently the radio module can be reset to an idle mode once again. In this way it is ensured that the radio module does not remain in the energy-intensive transmitting or receiving mode for longer than necessary. After a transmitting or receiving transaction has been completed, sufficient information for determining the position is available, so a radio link no longer has to be maintained. Equally, the transmitting and/or receiving mode can be terminated whenever the position of the communication device no longer changes, which is always the case when the motion sensor detects no movement or acceleration.

In another particularly preferred embodiment of the invention, the processor unit puts the radio module into the transmitting and/or receiving mode by connecting a voltage supply for electrically powering the radio module and the processor unit to the radio module. In this way it is very simple, by means of a corresponding circuit, to effect a change between the transmitting and/or receiving mode and an idle mode without transmitting and receiving activity. In this case the voltage supply can be a separate supply, but can also be part of the communication device itself. Preferably said voltage supply is of two-stage design, wherein a first stage provides a low level of power for operating the processor unit, the power being dimensioned such that operation in both the idle mode of the processor and in a normal operating mode of the processor without radio module is ensured. A second stage of the voltage supply provides a high level of power which is selected to be great enough to be sufficient for operation of the radio module in the transmitting and/or receiving mode.

In a further embodiment of the device according to the invention, the voltage supply comprises at least one current source. In particular the voltage supply can also include only a single current source by means of which both the processor unit and the radio module are powered. Since only one current source is provided, the design of the unit is simple. In this case the current source is preferably a DC (direct current) current source.

In a further embodiment of the invention, the voltage supply comprises a first voltage regulator for the processor unit, said first voltage regulator being connected to the at least one current source, and a second voltage regulator for the radio module, which second voltage regulator can be coupled to the at least one current source, the second voltage regulator being coupled to the current source in the transmitting and/or receiving mode of the radio module. Through the use of said voltage regulators it is ensured that sufficient power is always provided at a constant voltage both for the operation of the processor unit and for the operation of the radio module.

In a particularly preferred embodiment of the invention, the at least one voltage source comprises one or more batteries, in particular rechargeable batteries. By this means easy integration of the current source in the communication device can be ensured.

In a further embodiment of the invention, the at least one current source is also coupled to at least one self-sufficient energy generating means for generating electrical energy. Self-sufficient energy generating means of this kind include, for example, a solar cell unit and/or an inertial generator and/or a unit for obtaining electrical energy from electric and/or magnetic and/or electromagnetic fields and/or a transducer for converting mechanical into electrical energy. In this way the operation time of the communication device can be extended in addition, since the device itself generates energy by corresponding means and uses this energy for its operation.

In a further particularly preferred embodiment of the invention, the motion sensor is a vibration sensor. Preferably the motion sensor is also a passive mechanical sensor which requires no separate energy supply. Using a passive sensor further reduces the energy consumption of the communication device.

In a further embodiment of the invention, the position of the communication device is determined from received or transmitted communication signals directly in the processor unit. It is, however, also possible for the position to be calculated, not in the communication device, but in a separate computing unit, said computing unit communicating with the communication device wirelessly, e.g. via the radio module.

In a further embodiment, the processor unit can process signals from one or more additional sensors, in particular from a temperature sensor and/or a pushbutton switch. This enables further parameters to be recorded in addition to the position of the communication device. For example, a message indicating that the ambient temperature is exceeding a predefined value can be output wirelessly via the radio module. Measures can then be taken as necessary to remove the communication device or the article to which it is attached from the hot environment.

Where appropriate the communication device can also possess one or more interfaces, in particular at least one serial interface, the interfaces being controllable by the processor unit. This enables further units, e.g. additional radio modules, to be connected to the communication device as necessary.

In a particularly preferred embodiment of the invention, the communication device is realized in a very compact design so as to make it mobile, i.e. it can be worn by a user and/or attached to objects whose position is to be tracked.

The wireless communication of the radio module can take place over any wireless networks, WLAN, Bluetooth, DECT, GSM, UMTS and GPS in particular being suitable in this regard.

BRIEF DESCRIPTION OF THE DRAWINGS

Exemplary embodiments of the invention are described in detail below with reference to the appended figure, in which:

FIG. 1 shows a schematic block diagram in which the components of an embodiment of the communication device according to the invention are represented.

DETAILED DESCRIPTION OF INVENTION

In the embodiment of the communication module according to the invention that is described in the following, the device is a mobile unit with compact dimensions, enabling the unit to be worn by a user or attached to objects or goods. The dimensions of the unit roughly correspond to the size of a paperback, further miniaturization down to the size of a cell phone or even smaller also being conceivable. The layout of said communication device is shown schematically in FIG. 1. An essential component of said device is a radio module 2, in the form of a card for wireless communication for example, in particular a WLAN card. The radio module 2 is connected to a bus 3a of a processor 3 via the Compact Flash interface that is sufficiently known from the prior art. The LPC2138 processor from the company Philips or the MSP430 processor from Texas Instruments, for example, can be used as the processor, though the device according to the invention can also be implemented using other processors if need be.

The processor unit 3 has a plurality of converters or controllers. In particular the processor unit comprises an analog/digital converter 3b to which an external apparatus, a measuring instrument for example, can be connected so that the analog signals of the measuring instrument are converted by the converter 3b into corresponding digital signals and can be processed in the processor. The processor unit 3 also includes a digital/analog converter 3c which can output analog voltages, for controlling a loudspeaker for example. Also provided is an interface 3d for general purposes, also referred to as GPIO (GPIO=General Purpose Input Output). Said interface is connected on the one hand to a pushbutton switch 12 and on the other hand to a vibration sensor 10. The pushbutton switch 12 can be provided for example to allow control by a user, the user actuating the pushbutton switch under certain conditions, for example when an emergency situation arises, whereupon a corresponding signal is sent wirelessly via the radio module 2 to a central unit. The vibration sensor 10 constitutes an important component of the communication device according to the invention, since the electrical energy supply for the radio module 2 is controlled via the signals of said sensor, as will be described in more detail further below. A suitable example of a vibration sensor 10 is a mechanical sensor which only operates passively, i.e. without its own energy supply, thereby lowering the energy consumption of the communication device still further. The sensor of the type MS24 from the company Assemtech, for example, has proved a suitable sensor.

The processor unit 3 also comprises what is known as an I²C interface 3e via which any I²C sensors can be connected. In the embodiment of FIG. 1, a temperature sensor 11 is connected to said interface. Finally, the processor unit 3 also includes a so-called UART controller 3f by means of which a serial interface 13 can be controlled. Further radio modules, such as e.g. a GPS module or a GSM module, can be connected to the processor via the serial interface 13, for example. The processor is preferably programmed in such a way that it can determine the position of the communication device via the communication signals which are received by the radio module 2. The communication device can thus pinpoint its own position and forward it via the radio module to a central point.

In the embodiment shown in FIG. 1, the communication device has its own voltage supply which includes a current source 4 in the form of rechargeable batteries. In this arrangement the current source 4 is connected to the processor via a first voltage regulator 5 and to the radio module via a second voltage regulator 6. The first voltage regulator regulates the voltage required for the processor and the second voltage regulator regulates the voltage required for the radio module 2. In this case the first voltage regulator 5 provides only the power required for the operation of the processor, whereas the second voltage regulator 6 supplies the much higher power for the operation of the radio module. In the embodiment shown in FIG. 1, the voltage regulator 5 is a linear regulator, and the voltage regulator 6 is what is termed a DC/DC voltage converter. In the idle state of the LPC2138 processor, the current consumption provided via the voltage regulator 5 is approx. 30 µA, whereas 80 mA and 120 mA are provided for the receiving and transmitting mode, respectively, of a WLAN radio module via the voltage regulator 6.

Since the radio module requires a very high level of power compared to the processor, there is the problem that the batteries would very quickly be drained if the radio module is constantly in the radio or receiving mode. In order to avoid this, the processor has a controller by means of which the current source 4 can be separated from the second voltage regulator 6 and hence from the radio module 2 by way of a switch 8. Control of the switch 8 is indicated schematically in FIG. 1 by means of an arrow P proceeding from the processor to the switch 8. In the communication device according to the invention, use is made herein of the fact that the transmitting or receiving of communication signals for the purpose of detecting position is only necessary when the position of the communication device changes. For this reason the processor 3 of the device according to FIG. 1 is embodied in such a way that when detection signals from the vibration sensor 10 are received, i.e. upon detection of an acceleration or movement of the communication device, it connects the current source to the radio module 2 via the switch 8, whereupon the radio module 2 is put into the transmitting or receiving mode and a new pinpointing of the position of the communication device can be performed by the processor.

After a certain time has elapsed, in particular after a position-locating operation has been performed and no further vibrations are detected via the sensor 10, the current source 4 is once again separated from the radio module 2 by way of the switch 8, with the result that the radio module 2 returns to the idle mode. The device according to FIG. 1 therefore consumes a high amount of energy only when vibrations or accelerations are detected and for the rest of the time is in an energy-saving mode which merely ensures a minimum energy supply for the processor (so-called "sleep mode").

In the system implemented in FIG. 1 using the Philips LPC2138 processor, given a battery capacity of 1000 mAh, a maximum service life of approx. 3.8 years can be achieved in principle provided the radio module remains switched off. A service life of up to 114 years can even be achieved if the aforementioned MSP430 processor from Texas Instruments is used.

The device according to FIG. 1 can optionally include a self-sufficient energy source 7, which in FIG. 1 is a solar cell. The solar cell is connected to the voltage source 4 via a charge controller which is integrated in the regulator 5, for example. Given sufficient illuminance, the charging of the current source 4 can be effected by the solar cell 7. In this way the energy consumption of the device is reduced even further. Instead of a solar cell, other units for generating energy can also be provided, an inertial generator, for example, which converts accelerations of the device into corresponding electrical energy. Equally, a transducer for converting mechanical energy into electrical energy can be provided, in the form of a direct-current generator for example. In certain cases the energy generating device can also derive energy from electromagnetic fields, in particular from the radio field of the communication network with which the radio module 2 communicates. Energy can also be obtained from corresponding magnetic or electric fields by inductive or capacitive coupling.

As is revealed by the following remarks, a single solar cell suffices to generate sufficient power for the idle current of the processor 3 under office lighting conditions. The illumination level for office lighting is approx. 500 lux. According to the photometric radiation equivalent $K_m$=683 lm/W (lm=lumen) for daylight, this therefore yields a radiant flux density of 0.732 W/m$^2$ for office lighting. Assuming a solar cell efficiency of 10%, a solar cell surface area of 5×6 cm, and an efficiency of the voltage regulator 5 and 6 of 0.5, the result is a net electrical output of 110 µW under office lighting conditions. The idle power dissipation of the aforementioned Philips LPC2138 processor is approx. 100 µW and the power dissipation for the likewise aforementioned MSP430 processor from Texas Instruments is around 3 µW. Both values are less than the net output under office lighting conditions. Thus, under typical conditions, i.e. use of the communication device in daytime and in buildings, sufficient energy is provided by means of a solar cell for operating the processor in the idle state. The energy of the current source 4 is therefore required only when the radio module is turned on, since then a high power level is necessary for the radio module itself as well as for the normal operation of the processor.

Since the energy consumption is considerably higher in the case of a radio transaction, a charge time of 30 results for office lighting when a solar cell is used. For this reason it is always necessary to provide the additional current source 4 by means of which the substantially higher energy requirement for the normal operating state of the processor, for the operation of the radio module and for buffering during times when lighting is insufficient and other tasks in the device is covered. In phases with an energy surplus, i.e. in the idle state of the processor and in good lighting conditions, a charging of the current source 4 can then be achieved. The actual service life of the device—as opposed to the maximum service life in the idle current state only—results from the actual lighting conditions and the energy requirement for processor activity, receiving and transmitting operations of the radio module and other operations such as measured value acquisition, battery monitoring, etc.

The invention claimed is:
1. A wireless communication device, comprising
an electrically powered radio module for wireless communication by receiving or transmitting communication signals in a transmitting and/or receiving mode;

an electrically powered processor unit for controlling the wireless communication via the radio module;

a motion sensor for detecting movements or accelerations of the communication device, the motion sensor outputting a detection signal to the processor unit when movements or accelerations of a predetermined magnitude occur;

wherein the processor unit is coupled to the motion sensor and the radio module in such a way that when the at least one detection signal of the motion sensor is output, the processor unit temporarily puts the radio module into the transmitting or receiving mode.

2. The communication device as claimed in claim 1, wherein the processor unit is embodied such that the processor unit puts the radio module into the transmitting or receiving mode until a transmitting or receiving transaction has been completed by the radio module or until a predetermined period of time without output of a detection signal by the motion sensor has elapsed.

3. The communication device as claimed in claim 1, wherein the processor unit puts the radio module into the transmitting or receiving mode by connecting a voltage supply for electrically powering the radio module and the processor unit to the radio module.

4. The communication device as claimed in claim 3, wherein the voltage supply is a two-stage voltage supply, a first stage providing a power level for operating the processor unit and a second stage providing a power level for operating the radio module in the transmitting or receiving mode of the radio module.

5. The communication device as claimed in claim 3, wherein the voltage supply comprises a current source.

6. The communication device as claimed in claim 5, wherein the voltage supply comprises a single current source where both the processor unit and the radio module are powered.

7. The communication device as claimed in claim 5, wherein the voltage supply comprises a first voltage regulator for the processor unit, the first voltage regulator is connected to the current source, and a second voltage regulator for the radio module, where the second voltage regulator is coupleable to the current source, and the second voltage regulator is coupled to the current source in the transmitting or receiving mode of the radio module.

8. The communication device as claimed in claim 5, wherein the current source comprises one or more batteries.

9. The communication device as claimed in claim 8, wherein the batteries are rechargeable batteries.

10. The communication device as claimed in claim 5, wherein the current source is coupled to an energy generating device that generates electrical energy.

11. The communication device as claimed in claim 10, wherein the energy generating device is selected from the group consisting of a solar cell unit, an inertial generator, a transducer for converting mechanical into electrical energy, a unit for obtaining electrical energy from electrical and/or magnetic and/or electromagnetic fields and combinations thereof.

12. The communication device as claimed in claim 11, wherein the motion sensor is a vibration sensor.

13. The communication device as claimed in claim 12, wherein the motion sensor is a passive mechanical sensor.

14. The communication device as claimed in claim 13, wherein the processor unit is capable of determining the position of the communication device by way of the received and/or transmitted communication signals of the radio module.

15. The communication device as claimed in claim 14, wherein the processor unit is capable of processis signals from a temperature sensor and/or from a pushbutton switch.

16. The communication device as claimed in claim 15, wherein the communication device has a serial interface which is controllable by the processor unit.

17. The communication device as claimed in claim 16, wherein the communication device is a mobile unit to be worn by a user and/or attached to objects whose position is to be located.

18. The communication device as claimed in claim 17, wherein the radio module is a module selected from the group consisting of: a WLAN, a Bluetooth, a DECT, a GPS, a GSM, a UMTS, and combinations thereof.

19. A wireless communication device, comprising an electrically powered radio module for wireless communication by receiving and transmitting communication signals in a transmitting and receiving mode;

an electrically powered processor unit for controlling the wireless communication via the radio module;

a motion sensor for detecting movements and accelerations of the communication device, the motion sensor outputting a detection signal to the processor unit when movements and accelerations of a predetermined magnitude occur;

wherein the processor unit is coupled to the motion sensor and the radio module in such a way that when the at least one detection signal of the motion sensor is output, the processor unit temporarily puts the radio module into the transmitting and receiving mode.

\* \* \* \* \*